(12) United States Patent
Simpson et al.

(10) Patent No.: US 10,598,211 B2
(45) Date of Patent: Mar. 24, 2020

(54) SPHERICAL BEARING SLEEVE CONFIGURED WITH ONE OR MORE DISCRETE COLLARS

(71) Applicant: United Technologies Corporation, Farmington, CT (US)

(72) Inventors: Alex J. Simpson, Tolland, CT (US); Edward A. Krystowski, Granby, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/161,831

(22) Filed: May 23, 2016

(65) Prior Publication Data

US 2017/0335884 A1    Nov. 23, 2017

(51) Int. Cl.
*F16C 11/04* (2006.01)

(52) U.S. Cl.
CPC ........ *F16C 11/045* (2013.01); *F16C 2360/23* (2013.01); *Y10T 403/32909* (2015.01)

(58) Field of Classification Search
CPC ..... Y10T 403/32631; Y10T 403/32704; Y10T 403/32861; Y10T 403/32863; Y10T 403/32909; Y10T 403/32934; Y10T 403/32918; F16C 11/045; F16C 11/0695; F16C 11/106
USPC ........ 403/122, 131, 150, 154, 156, 159, 157
See application file for complete search history.

(56) References Cited

U.S. PATENT DOCUMENTS

| | | | |
|---|---|---|---|
| 1,466,756 A * | 9/1923 | Rich | F16J 1/22 403/143 |
| 1,943,364 A * | 1/1934 | Betz | F16J 1/16 403/128 |
| 2,066,695 A * | 1/1937 | Peo | B60G 7/005 403/135 |
| 3,161,185 A * | 12/1964 | Justinien | F02B 1/00 123/78 R |
| 3,831,888 A * | 8/1974 | Baker | B64D 27/18 244/54 |
| 3,832,022 A * | 8/1974 | Reinsma | F16C 11/0614 384/146 |
| 4,065,077 A | 12/1977 | Brooks | |

(Continued)

FOREIGN PATENT DOCUMENTS

| | | |
|---|---|---|
| DE | 102007016171 | 10/2008 |
| EP | 0760433 | 3/1997 |
| GB | 1585795 | 3/1981 |

OTHER PUBLICATIONS

Extended EP Search Report for EP Appln. No. 17172292.9 dated Oct. 19, 2017.

*Primary Examiner* — Josh Skroupa
(74) *Attorney, Agent, or Firm* — Getz Balich LLC (57) ABSTRACT

A bearing joint assembly may include a bearing sleeve, a first collar, a first mount, a pair of second mounts and a fastener, which projects through the bearing sleeve and secures the bearing sleeve to the second mounts. The bearing sleeve extends axially along a centerline and includes a spherical bearing. The first collar is configured with the bearing sleeve. A first annular channel is formed by and extends axially between the spherical bearing and the first collar. The first mount is mounted on and slidably engages the spherical bearing. The spherical bearing and the first collar are axially between the second mounts.

18 Claims, 9 Drawing Sheets

(56) References Cited

U.S. PATENT DOCUMENTS

| | | | |
|---|---|---|---|
| 4,232,563 A * | 11/1980 | Peterson | B64C 27/32 248/635 |
| 4,243,192 A * | 1/1981 | Johnson | B64C 3/40 244/131 |
| 4,889,458 A * | 12/1989 | Taylor | F16B 21/10 403/156 |
| 4,943,013 A * | 7/1990 | Kabala | B64D 27/26 244/54 |
| 5,120,195 A * | 6/1992 | Schmaling | B64C 27/35 384/221 |
| 5,245,823 A | 9/1993 | Barcza | |
| 5,251,986 A * | 10/1993 | Arena | F16C 11/045 384/208 |
| 5,523,530 A | 6/1996 | Byrnes et al. | |
| 5,649,417 A * | 7/1997 | Hey | B64D 27/26 244/54 |
| 5,931,597 A * | 8/1999 | Urbach | B60G 7/005 403/122 |
| 6,173,919 B1 * | 1/2001 | Le Blaye | B64D 27/26 244/54 |
| 7,438,493 B2 * | 10/2008 | Holmes | F16C 11/0614 403/134 |
| 7,594,794 B2 | 9/2009 | Merry et al. | |
| 7,654,766 B2 * | 2/2010 | Zuge | B60G 7/005 403/145 |
| 7,753,612 B2 | 7/2010 | Bouru et al. | |
| 7,845,176 B2 | 12/2010 | Martin | |
| 8,002,489 B2 | 8/2011 | Mahy et al. | |
| 8,740,136 B2 * | 6/2014 | Audart-Noel | B64D 27/26 244/54 |
| 8,851,417 B2 * | 10/2014 | Sandy | B64D 27/26 244/54 |
| 8,925,944 B2 * | 1/2015 | Byrnes | B60G 7/005 280/124.134 |
| 9,133,768 B2 | 9/2015 | Martin | |
| 9,327,570 B2 * | 5/2016 | Karpman | B60G 7/005 |
| 9,592,917 B2 | 3/2017 | Cassagne et al. | |
| 9,593,708 B2 * | 3/2017 | Cassagne | F16B 39/24 |
| 9,676,489 B2 * | 6/2017 | Serra | B64D 27/26 |
| 9,874,146 B2 | 1/2018 | Keegan et al. | |
| 9,925,838 B2 * | 3/2018 | Karpman | B60G 7/005 |
| 10,228,057 B2 * | 3/2019 | Hudson | F16C 11/045 |
| 2005/0281611 A1 * | 12/2005 | Matczak | F16C 11/0614 403/122 |
| 2006/0088371 A1 * | 4/2006 | Dunn | F16C 11/0614 403/122 |
| 2007/0122232 A1 * | 5/2007 | Buchner | F16C 11/0614 403/122 |
| 2007/0189649 A1 * | 8/2007 | Montazeri | F16C 11/0614 384/192 |
| 2009/0016809 A1 | 1/2009 | Buhl et al. | |
| 2010/0215426 A1 * | 8/2010 | Mann | F16C 11/02 403/154 |
| 2011/0293360 A1 * | 12/2011 | Becker | F16C 11/045 403/161 |
| 2013/0114995 A1 * | 5/2013 | Godiot | F16C 11/0614 403/59 |
| 2013/0328284 A1 | 12/2013 | Byrnes | |
| 2014/0360152 A1 | 12/2014 | Waitkus et al. | |
| 2015/0016965 A1 | 1/2015 | Sawyers-Abbott et al. | |
| 2015/0322998 A1 * | 11/2015 | Lee | F16C 11/0614 403/133 |
| 2015/0337891 A1 | 11/2015 | Mano | |
| 2016/0083101 A1 | 3/2016 | Ronski et al. | |
| 2017/0102026 A1 | 4/2017 | Florent et al. | |
| 2017/0146126 A1 * | 5/2017 | Hudson | F16C 11/045 |

* cited by examiner

SPHERICAL BEARING SLEEVE CONFIGURED WITH ONE OR MORE DISCRETE COLLARS

This invention was made with government support under Contract No. N00019-02-C-3003 awarded by the United States Navy. The government may have certain rights in the invention.

BACKGROUND OF THE INVENTION

1. Technical Field

This disclosure relates generally to a moveable joint and, more particularly, to a spherical joint assembly for pivotally coupling components together.

2. Background Information

Various types of joints are known in the art for coupling two components together. An example of such a joint is a spherical joint, which pivotally couples the components together. Various spherical joint configurations are known and have various advantageous. However, there is still a need in the art for an improved spherical joint and, more particularly, an improved spherical joint assembly with increased robustness to tensile loads.

SUMMARY OF THE DISCLOSURE

According to an aspect of the present disclosure, a bearing joint assembly is provided that includes a bearing sleeve, a first collar, a first mount, a pair of second mounts and a fastener. The bearing sleeve extends axially along a centerline and includes a spherical bearing. The first collar is configured with the bearing sleeve. A first annular channel is formed by and extends axially between the spherical bearing and the first collar. The first mount is mounted on and slidably engages the spherical bearing. The spherical bearing and the first collar are axially between the second mounts. The fastener projects through the bearing sleeve and secures the bearing sleeve to the second mounts.

According to another aspect of the present disclosure, another bearing joint assembly is provided that includes a bearing sleeve, a first collar, a first mount, a pair of second mounts and a fastener. The bearing sleeve extends axially along a centerline and includes a spherical bearing. The spherical bearing includes a radial outer spherical surface with a minimum radius value. The first collar is configured with the bearing sleeve. The first collar includes a radial outer collar surface with a maximum radius value that is greater than the minimum radius value of the radial outer spherical surface. The first mount is mounted on and slidably engages the spherical bearing. The bearing sleeve and the first collar are axially between the second mounts. The fastener projects through the bearing sleeve and secures the bearing sleeve to the second mounts.

According to still another aspect of the present disclosure, another bearing joint assembly is provided that includes a bearing sleeve, a first collar, a second collar and a linkage. The bearing sleeve extends axially along a centerline and includes a spherical bearing. The first collar is mechanically attached to and/or bonded to the bearing sleeve. A first annular channel is formed by and extends axially between the spherical bearing and the first collar. The second collar is configured with the bearing sleeve. A second annular channel is formed by and extends axially between the spherical bearing and the second collar. The linkage includes a first mount slidably engaged with the spherical bearing. The spherical bearing is captured within an aperture extending axially through the first mount.

The first collar is mechanically attached to the bearing sleeve. In addition or alternatively, the first collar is bonded to the bearing sleeve.

The bearing sleeve may be configured from a first material. The first collar may be configured from a second material that is different from (or the same as) the first material.

The spherical bearing may include a radial outer spherical surface with a minimum radius value. The first collar may include a radial outer collar surface with a maximum radius value that is greater than the minimum radius value of the radial outer spherical surface.

The radial outer spherical surface may have a maximum radius value. The maximum radius value of the radial outer collar surface may be less than or equal to the maximum radius value of the radial outer spherical surface.

The radial outer spherical surface may have a maximum radius value. The maximum radius value of the radial outer collar surface may be greater than the maximum radius value of the radial outer spherical surface.

The first collar may include a radial outer collar surface. At least a portion of the radial outer collar surface may taper radially inwards as the first collar extends axially towards the spherical bearing.

The at least a portion of the radial outer collar surface may be a first portion. A second portion of the radial outer collar surface may have a cylindrical geometry.

The assembly may include a second collar configured with the bearing sleeve. A second annular channel may be formed by and extend axially between the spherical bearing and the second collar. The spherical bearing may be axially between the first collar and the second collar.

The assembly may include a strut that includes the first mount. The assembly may also include a turbine engine component that includes the second mounts.

An annular channel may be formed by and extend axially between the spherical bearing and the first collar.

The foregoing features and the operation of the invention will become more apparent in light of the following description and the accompanying drawings.

DETAILED DESCRIPTION OF THE INVENTION

Figure 1:
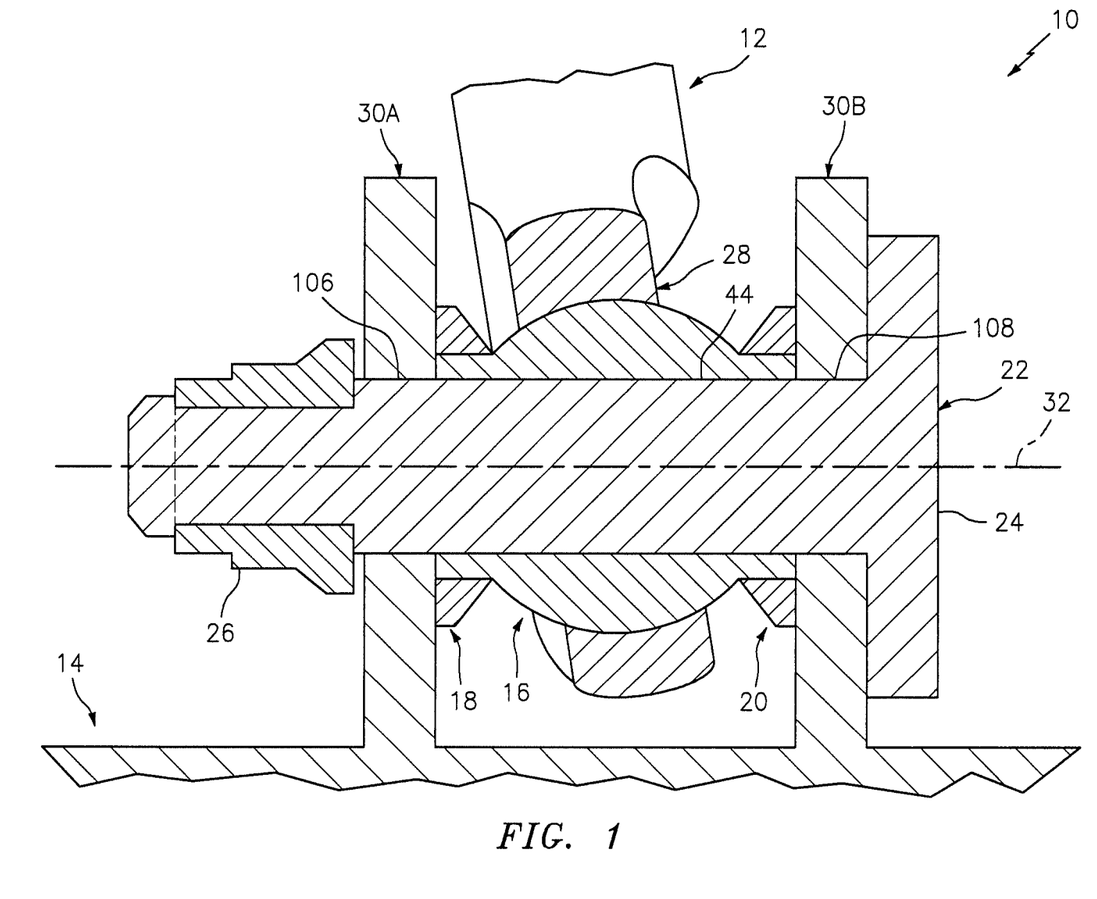
FIG. 1 is a partial side sectional illustration of a bearing joint assembly.

FIG. 1 illustrates a bearing joint assembly 10. This bearing joint assembly 10 is configured to provide a spherical bearing joint between two components 12 and 14, which enables generally spherical pivoting movement between the components 12 and 14. Such a bearing joint assembly may be configured for an aeronautical, industrial or other gas turbine engine applications. For example, the first component 12 may be an actuation linkage (e.g., a strut) for actuating movement of another component of the gas turbine engine; e.g., a component of a variable exhaust nozzle, a variable vane, etc. The bearing joint assembly 10 of the present disclosure, however, is not limited to such exemplary component configurations, or to gas turbine engine application. The bearing joint assembly 10, in particular, can be configured for use in any application where a joint moveably (or statically) couples two components together.

The bearing joint assembly 10 of FIG. 1 includes the first component 12, the second component 14, a bearing sleeve 16, one or more bearing sleeve collars 18 and 20 and a fastener 22. This fastener 22 may include a bolt 24 and a nut 26, or any other type of pin and retainer. The bearing joint assembly 10 also includes a least a first mount 28 (e.g., a flange or tab) and two or more (shown as a pair in FIG. 1) of second mounts 30A and 30B (e.g., a flange or tab).

The first component 12 may include the first mount 28. For example, the first mount 28 may be configured as a distal flange/tab/tongue of the first component 12; e.g., the actuation linkage. Alternatively, the first mount 28 may be formed discrete from and subsequently attached (e.g., mechanically fastened and/or bonded) to the first component 12.

The second component 14 may include the second mounts 30A and 30B. For example, the second mounts 30A and 30B may be configured as tabs/flanges projecting out from the second component 14; e.g., the turbine engine component. Alternatively, one or more of the second mounts 30A and 30B may each be formed discrete from and subsequently attached to the second component 14.

Figure 2:
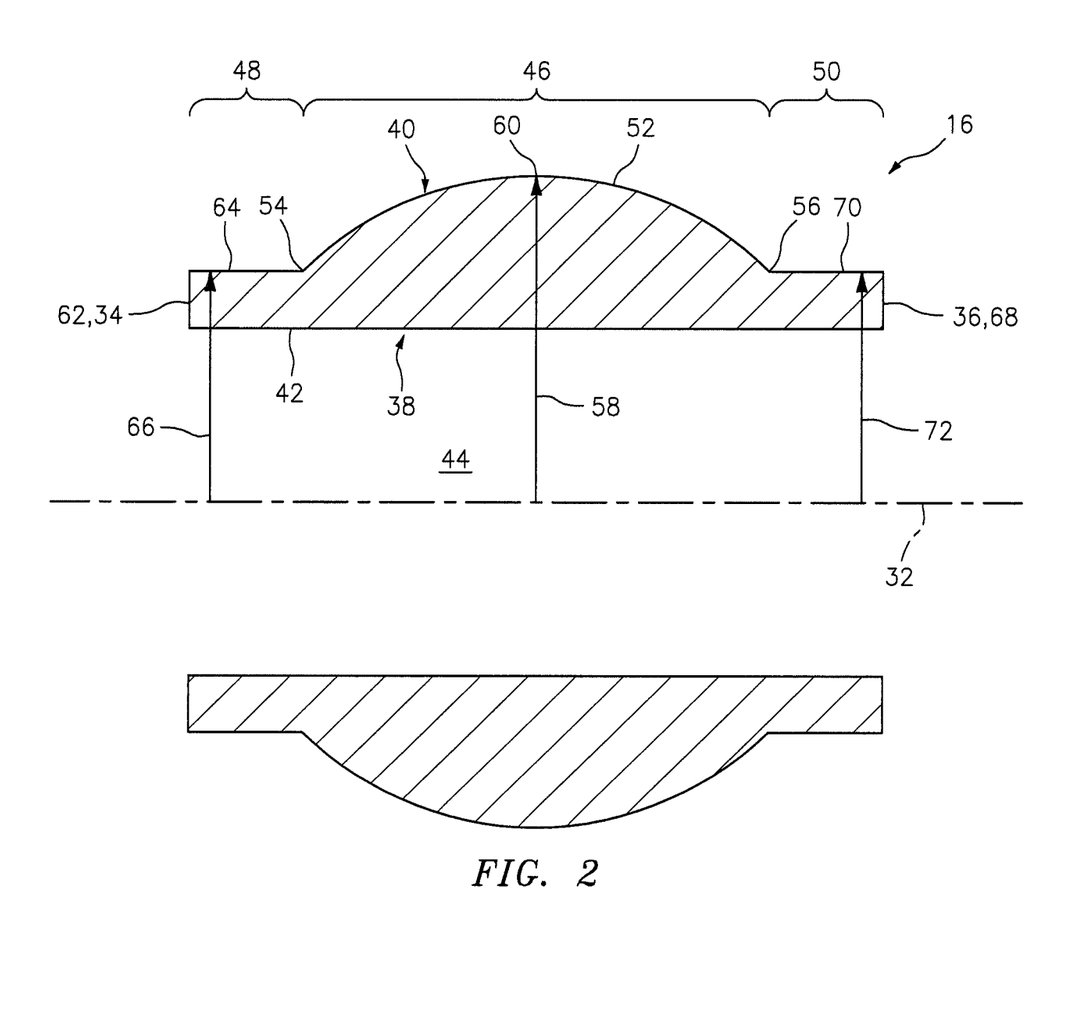
FIG. 2 is a side sectional illustration of a bearing sleeve.

Referring to FIG. 2, the bearing sleeve 16 extends axially along a centerline 32 between opposing first and second axial ends 34 and 36. The bearing sleeve 16 extends radially out from an inner periphery 38 to an outer periphery 40, where an inner sleeve surface 42 at the inner periphery 38 forms a bore 44 axially through the bearing sleeve 16. The bearing sleeve 16 also extends circumferentially around the centerline 32, thereby providing the bearing sleeve 16 with a generally tubular geometry.

The bearing sleeve 16 includes a spherical bearing 46 and one or more collar mounts 48 and 50. The bearing sleeve 16 of FIG. 2 is formed as a monolithic body. For example, all portions of the bearing sleeve 16 may be formed (e.g., cast, machined, additively manufactured, etc.) integral with one another as a single unit. Thus, none of the bearing sleeve portions 46, 48 and 50 are discretely formed elements and then (e.g., mechanically) attached to one another. The present disclosure, however, is not limited to such an exemplary monolithic bearing sleeve 16 body embodiment.

The spherical bearing 46 is disposed and extends axially between the first collar mount 48 and the second collar mount 50. The spherical bearing 46 extends radially out from the inner sleeve surface 42 to a radial outer spherical surface 52 (e.g., a spherical bearing surface) at the outer periphery 40. This spherical surface 52 extends axially between a first end 54 and a second end 56, where the first end 54 is adjacent (or in close proximity to) the first collar mount 48 and the second end 56 is adjacent (or in close proximity to) the second collar mount 50. The spherical surface 52 extends circumferentially around the centerline 32.

A radius 58 of the spherical surface 52 changes as the spherical surface 52 axially extends between the first end 54 and the second end 56 to provide the spherical surface 52 with a circular side sectional geometry. With this geometry, the radius 58 has a first minimum radius value (e.g., left hand side minimum radius value) at the first end 54. The radius 58 has a second minimum radius value (e.g., right hand side minimum radius value) at the second end 56, which second minimum radius value may be approximately equal to the first minimum radius value. At an intermediate point 60 (e.g., a midpoint) axially between the first end 54 and the second end 56, the radius 58 has a maximum radius value (e.g., a peak value) that is greater than the first minimum radius value and the second minimum radius value. The term "minimum" may describe an axial point where the radius 58 has the smallest value towards a respective side of a peak; e.g., the intermediate point 60. The term "maximum" may describe an axial point (peak point) where the radius 58 has the largest value; e.g., at the intermediate point 60.

The first collar mount 48 is disposed at (e.g., on, adjacent or proximate) the first axial end 34. The first collar mount 48 of FIG. 2, for example, forms a first end surface 62 at the first axial end 34. The first collar mount 48 extends radially out from the inner sleeve surface 42 to a first mount surface 64 at the outer periphery 40. This first mount surface 64 extends axially from the first end surface 62 at the first axial end 34 to (and may be contiguous with) the first end 54 of the spherical surface 52, and has a substantially constant radius 66. The first mount surface 64 extends circumferentially around the centerline 32.

The second collar mount 50 is disposed at (e.g., on, adjacent or proximate) the second axial end 36. The second collar mount 50 of FIG. 2, for example, forms a second end surface 68 at the second axial end 36. The second collar mount 50 extends radially out from the inner sleeve surface 42 to a second mount surface 70 at the outer periphery 40. This second mount surface 70 extends axially from the second end surface 68 at the second axial end 36 to (and may be contiguous with) the second end 56 of the spherical surface 52, and has a substantially constant radius 72. The second mount surface 70 extends circumferentially around the centerline 32.

Figure 3:
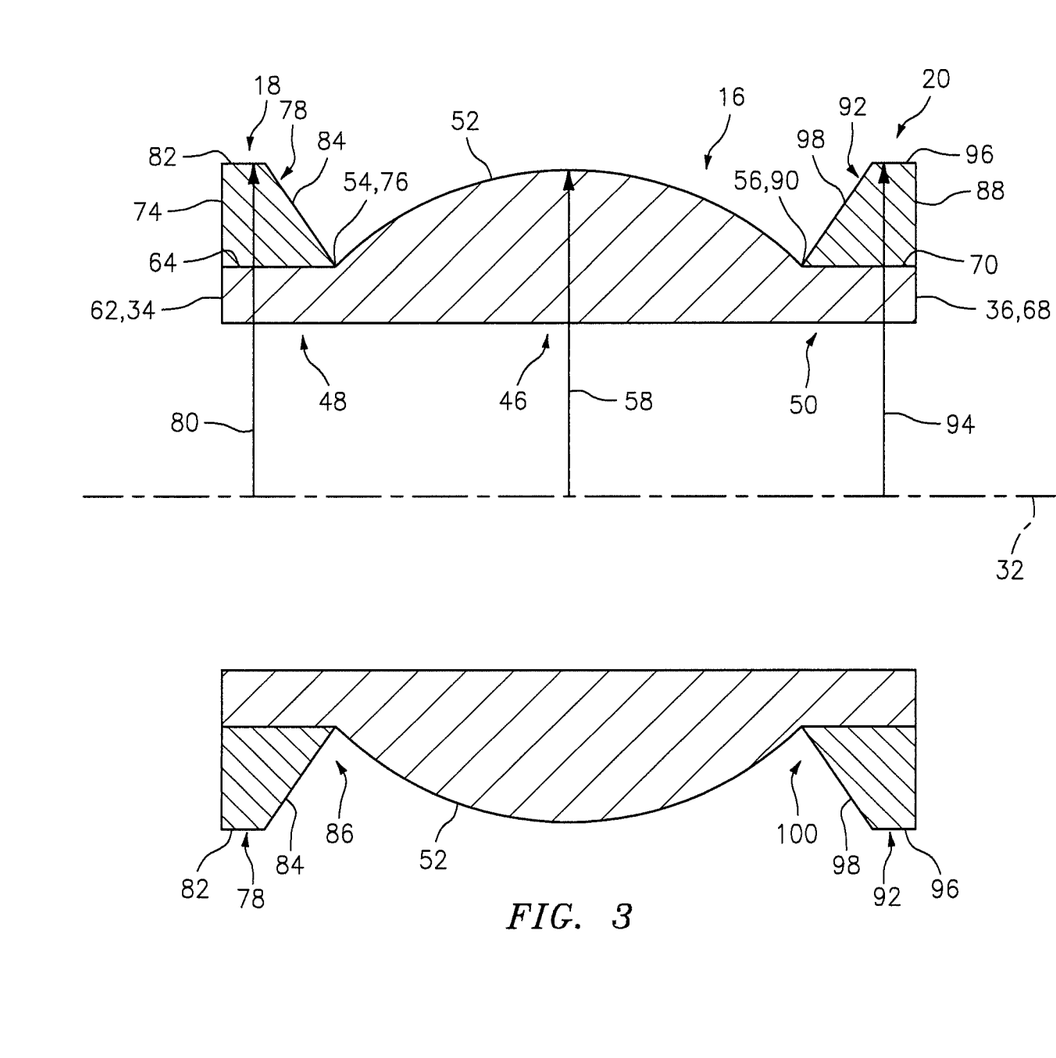
FIG. 3 is a side sectional illustration of collars mounted on the bearing sleeve.

Referring to FIG. 3, the first collar 18 is configured as a unitary annular ring. This first collar 18 is formed discrete from the bearing sleeve 16 and then mounted on the first collar mount 48. The first collar 18, for example, may be mechanically attached to the first collar mount 48 by a press-fit, a stake fit and/or otherwise. The first collar 18 may also or alternatively be bonded to the first collar mount 48 by braze or an adhesive. The present disclosure, however, is not limited to the foregoing attachment techniques.

The first collar 18 extends axially between opposing first collar ends 74 and 76. The first collar end 74 is axially aligned with the first axial end 34 and may form an outer portion of the first end surface 62. The first collar 18 radially engages the first mount surface 64, and extends radially out from the first mount surface 64 to a radial outer collar surface 78. This collar surface 78 extends axially from the first end surface 62 to (and may be contiguous with) the first end 54 of the spherical surface 52. The collar surface 78 extends circumferentially around the centerline 32.

A radius 80 of the collar surface 78 may change as the collar surface 78 axially extends from the first axial end 34 to the spherical bearing 46 to provide the collar surface 78 with a radially tapering side sectional geometry. The collar surface 78 of FIG. 3, for example, includes a first portion 82 and a second portion 84. The first portion 82 may have a substantially cylindrical geometry, where the radius 80 is substantially constant. The second portion 84 may have a substantially conical geometry, which radially tapers (e.g., the radius 80 decreases) as the second portion 84 extends axially from the first portion 82 to the spherical surface 52. With this configuration, the radius 80 of the first portion 82 has a maximum radius value and the radius 80 of the second portion 84 adjacent the spherical surface 52 has a minimum radius value, which minimum radius value is substantially equal to the first minimum radius value of the radius 58. The maximum radius value of the radius 80 is greater than the first minimum radius value of the radius 58. The maximum radius value of the radius 80 may be substantially equal to (or less or greater than) the maximum radius value of the radius 58.

Figure 4:
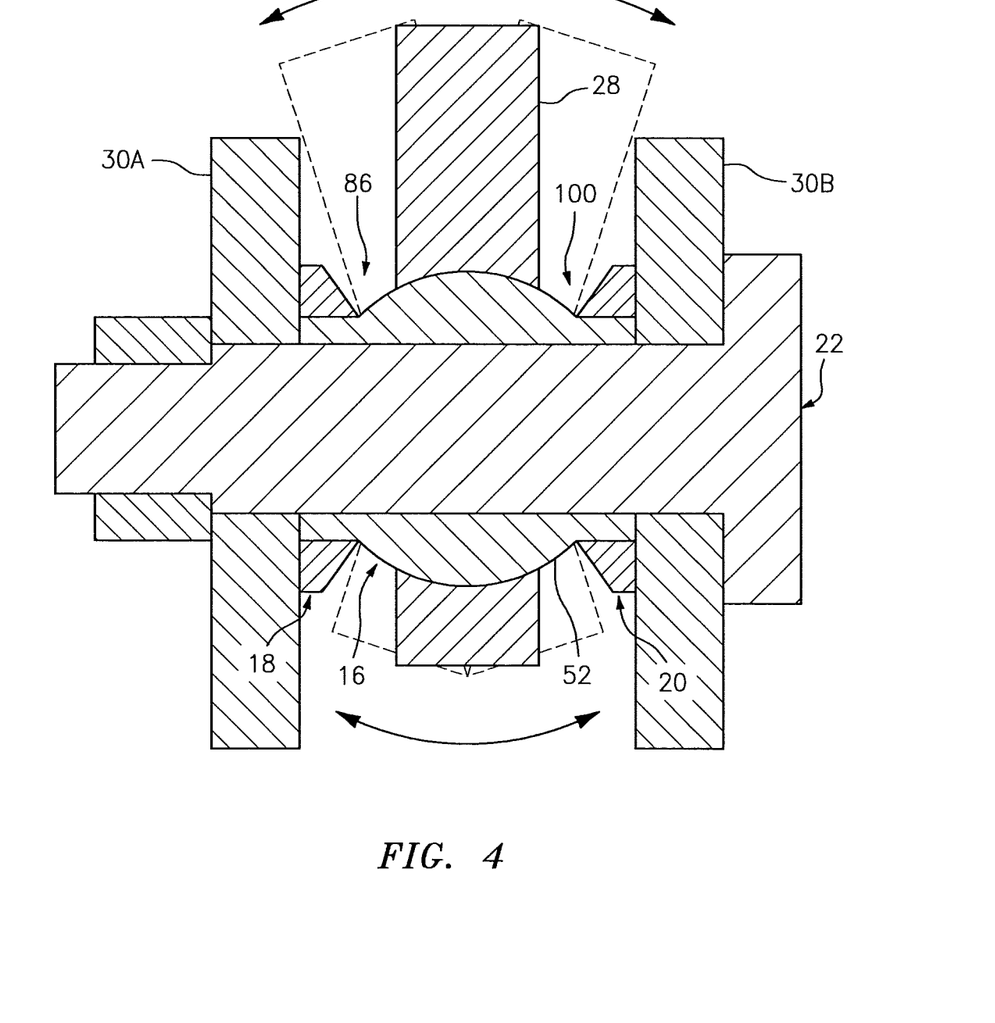
FIG. 4 is a partial side sectional illustration of the bearing joint assembly with its first mount articulating from side to side.

The first collar 18 and the spherical bearing 46 collectively form a first annular channel 86. This first annular channel 86 is formed by and extends axially between the collar surface 78 and the spherical surface 52. The first annular channel 86 extends radially into the bearing sleeve 16 (towards the centerline 32) to an intersection (e.g., trough point) between the first collar 18 and the spherical bearing 46. The first annular channel 86 extends circumferentially around the centerline 32 through the bearing sleeve 16. This first annular channel 86 provides space for the first mount 28 to pivot about the spherical bearing 46 and, for example, freely articulate between the second mounts 30A and 30B as shown in FIG. 4. The first collar 18 of FIG. 4 therefore is configured (e.g., sized and shaped) to enable unobstructed movement of the first mount 28 by the first collar 18. Of course, as shown in FIG. 4, movement of the first mount 28 may be obstructed by other elements such as the second mounts 30A and 30B.

Referring to FIG. 3, the second collar 20 is configured as a unitary annular ring. This second collar 20 is foamed discrete from the bearing sleeve 16 and then mounted on the second collar mount 50. The second collar 20, for example, may be mechanically attached to the second collar mount 50 by a press-fit, a stake fit and/or otherwise. The second collar 20 may also or alternatively be bonded to the second collar mount 50 by braze or an adhesive. The present disclosure, however, is not limited to the foregoing attachment techniques.

The second collar 20 extends axially between opposing second collar ends 88 and 90. The second collar end 90 is axially aligned with the second axial end 36 and may form an outer portion of the second end surface 68. The second collar 20 radially engages the second mount surface 70, and extends radially out from the second mount surface 70 to a radial outer collar surface 92. This collar surface 92 extends axially from the second end surface 68 to (and may be contiguous with) the second end 56 of the spherical surface 52. The collar surface 92 extends circumferentially around the centerline 32.

A radius 94 of the collar surface 92 may change as the collar surface 92 axially extends from the second axial end 36 to the spherical bearing 46 to provide the collar surface 92 with a radially tapering side sectional geometry. The collar surface 92 of FIG. 3, for example, includes a first portion 96 and a second portion 98. The first portion 96 may have a substantially cylindrical geometry, where the radius 94 is substantially constant. The second portion 98 may have a substantially conical geometry, which radially tapers (e.g., the radius 94 decreases) as the second portion 98 extends axially from the first portion 96 to the spherical surface 52. With this configuration, the radius 94 of the first portion 96 has a maximum radius value and the radius 94 of the second portion 98 adjacent the spherical surface 52 has a minimum radius value, which minimum radius value is substantially equal to the first minimum radius value of the radius 58. The maximum radius value of the radius 94 is greater than the first minimum radius value of the radius 58. The maximum radius value of the radius 94 may be substantially equal to (or less or greater than) the maximum radius value of the radius 58.

The second collar 20 and the spherical bearing 46 collectively form a second annular channel 100. This second annular channel 100 is formed by and extends axially between the collar surface 92 and the spherical surface 52. The second annular channel 100 extends radially into the bearing sleeve 16 (towards the centerline 32) to an intersection (e.g., trough point) between the second collar 20 and the spherical bearing 46. The second annular channel 100 extends circumferentially around the centerline 32 through the bearing sleeve 16. This second annular channel 100 provides space for the first mount 28 to pivot about the spherical bearing 46 and, for example, freely articulate between the second mounts 30A and 30B as shown in FIG. 4. The second collar 20 of FIG. 4 therefore is configured (e.g., sized and shaped) to enable unobstructed movement of the first mount 28 by the second collar 20. Of course, as shown in FIG. 4, movement of the first mount 28 may be obstructed by other elements such as the second mounts 30A and 30B.

The first collar 18 and the second collar 20 of FIG. 3 are illustrated with substantially mirror image configurations; e.g., geometry (shapes), sizes, etc. However, the bearing joint assembly 10 of the present disclosure is not limited to such an exemplary embodiment. For example, in other embodiments, the first collar 18 and the second collar 20 may each have a different, individual configuration; e.g., geometry and/or size.

Figure 5:
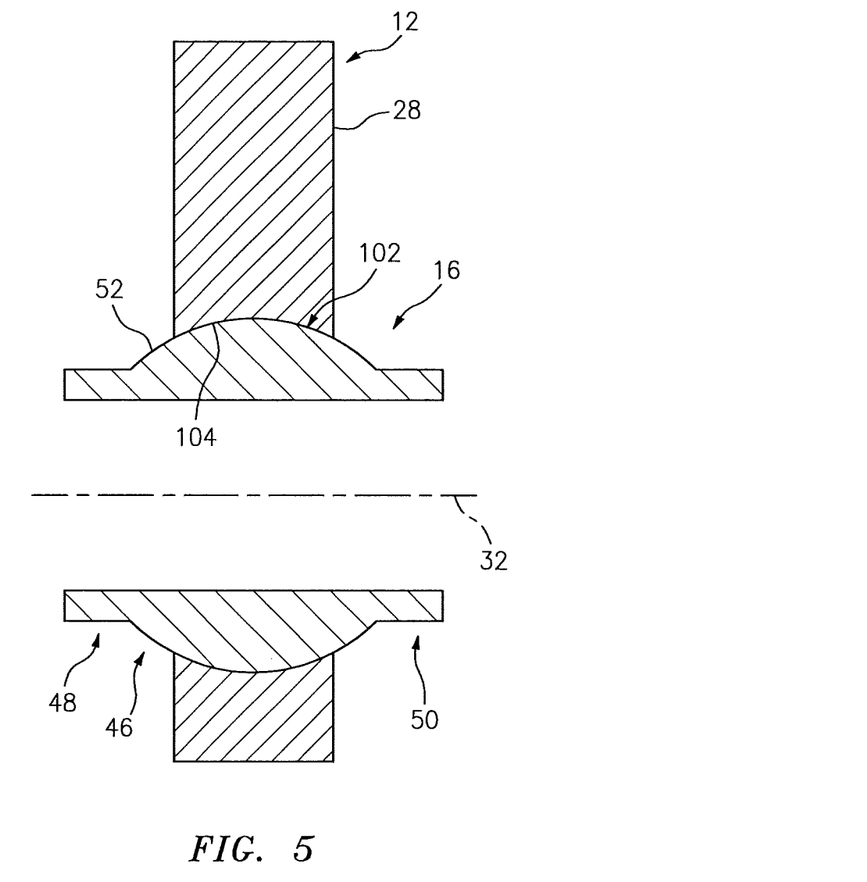
FIGS. 5 and 6 are sectional illustrations depicting a sequence of assembling components of the bearing joint assembly.
Figure 6:
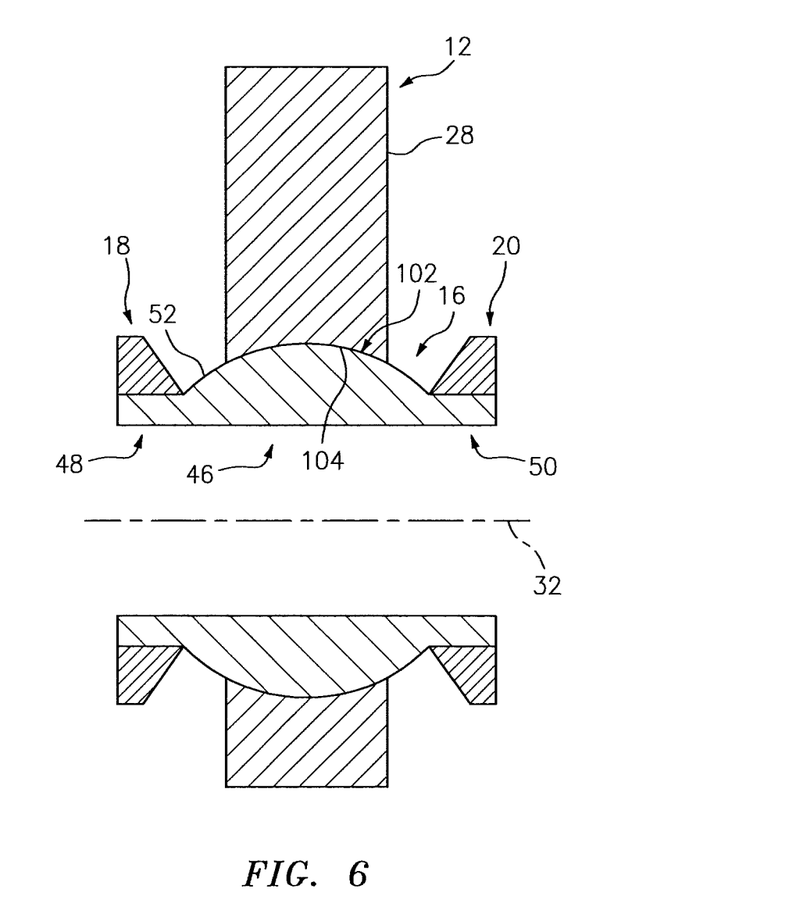

FIGS. 5 and 6 illustrate a sequence depicting assembly of the joint assembly components 12, 16, 18 and 20. During this assembly sequence, one of the collar mounts 44, 46 is passed through a bearing aperture 102 in the first mount 28 until the spherical bearing 46 and the first mount 28 are aligned. The first mount 28 may then be swaged to capture the spherical bearing 46 within the bearing aperture 102 as shown in FIG. 5. The spherical surface 52 thereby engages (e.g., contacts) a surface 104 of the first mount 28 that forms the bearing aperture 102, which enables the first mount 28 to slide on the spherical surface 52 and pivot relative to the bearing sleeve 16. The first collar 18 and the second collar 20 are subsequently attached (e.g., press fit) to the first collar mount 48 and the second collar mount 50 as shown in FIG. 6. In other embodiments, however, the first collar 18 or the second collar 20 may be attached to the bearing sleeve 16 before the mounting of the first mount 28 with the spherical bearing 46 where the opposing second collar mount 50 or first collar mount 48 is passed through the bearing aperture 102. Of course, in still other embodiments, the first collar 18 and/or the second collar 20 may be mounted to the bearing sleeve 16 before the mounting of the first mount 28 with the spherical bearing 46 where the maximum radius value of the radius 80, 94 (see FIG. 3) of at least one of the collars 18, 20 is less than the maximum radius value of the radius 58 of the spherical bearing 46; i.e., so at least one of the collars 18, 20 can be passed through the bearing aperture 102 during assembly.

Referring to FIG. 1, the bearing sleeve 16 and, thus, the first collar 18 and the second collar 20 are disposed axially between the second mounts 30A and 30B after the assembly of the joint assembly components 12, 16, 18 and 20. With this configuration, the first collar 18 is disposed axially next to (and may axially engage) the second mount 30A. The second collar 20 is disposed axially next to (and may axially engage) the second mount 30B. The bolt 24 is inserted sequentially through mounting apertures (108, 44, 106) respectively in the second mount 30B, the bearing sleeve 16 and the second mount 30A. The nut 26 is threaded onto an end of the bolt 24, thereby securing the bearing sleeve 16 and, thus, the first mount 28 with the second mounts 30A and 30B.

During operation of the bearing joint assembly 10, the first mount 28 may pivot about the spherical bearing 46 as illustrated in FIG. 4. The bearing joint assembly 10 may also transfer loads between the first component 12 and the second component 14. The bearing joint assembly 10 may be in compression where the first mount 28 and the second mounts 30A and 30B push (radially relative to the centerline 32) towards one another. Alternatively, the bearing joint assembly 10 may be in tension where the first mount 28 and the second mounts 30A and 30B pull (radially relative to the centerline 32) away from one another. Depending upon the magnitude of the load being transferred, the bolt 24 may have a tendency to bend. Such bending subjects the spherical bearing 46 to a compressive load whereas the first collar 18 and the second collar 20 are subjected to tensile loads. To accommodate these inverse loads and resist ovalization of the bearing sleeve 16, the first collar 18 and the second collar 20 are sized with relatively large radiuses 80 and 94 (see FIG. 3); e.g., where the maximum radius values of the radiuses 80 and 94 is greater than the minimum radius values of the radius 58 to as to strengthen the end regions of the bearing sleeve 16.

Figure 7:
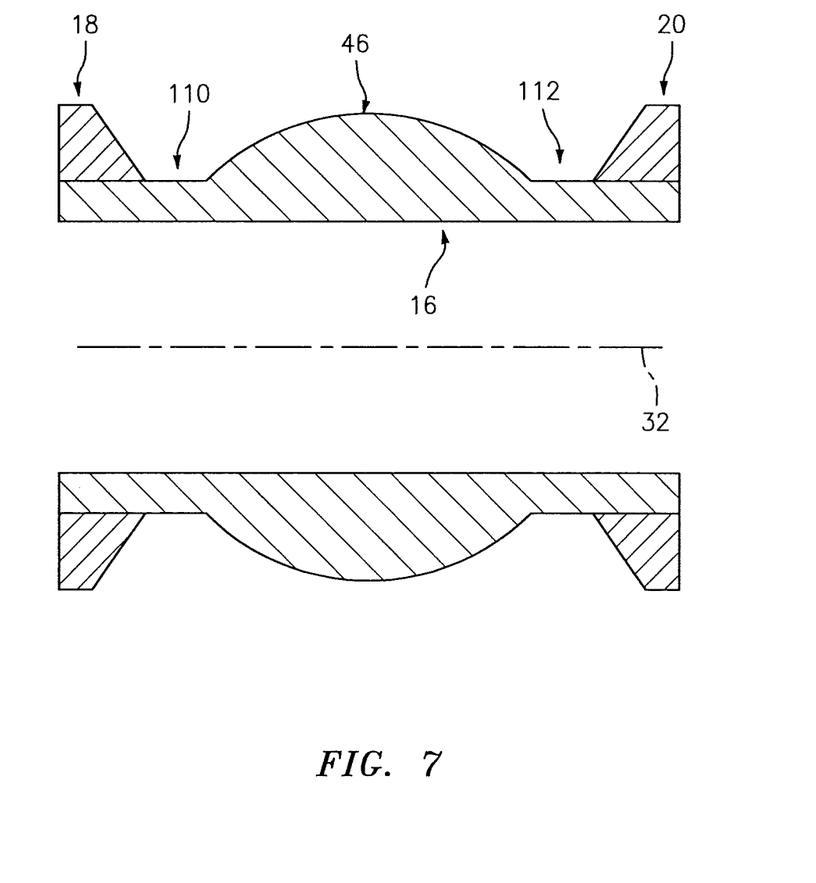
FIGS. 7-9 are side sectional illustrations of alternative embodiment bearing sleeves configured with alternative embodiment collars.
Figure 8:
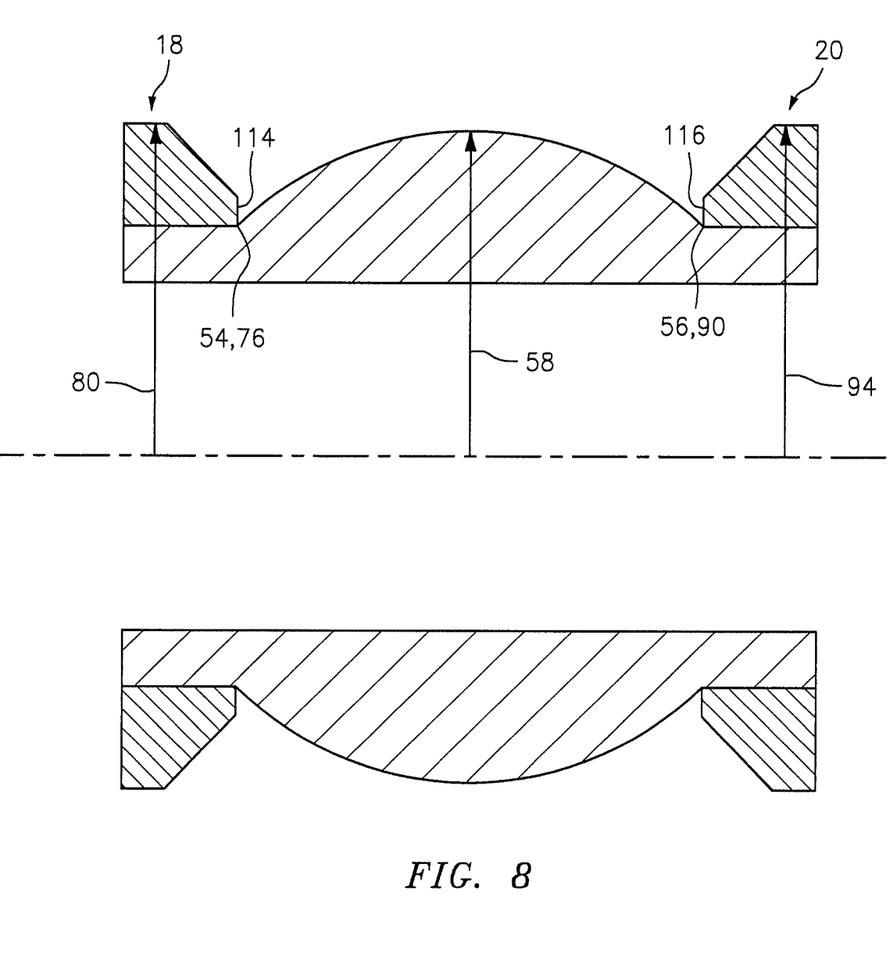
Figure 9:
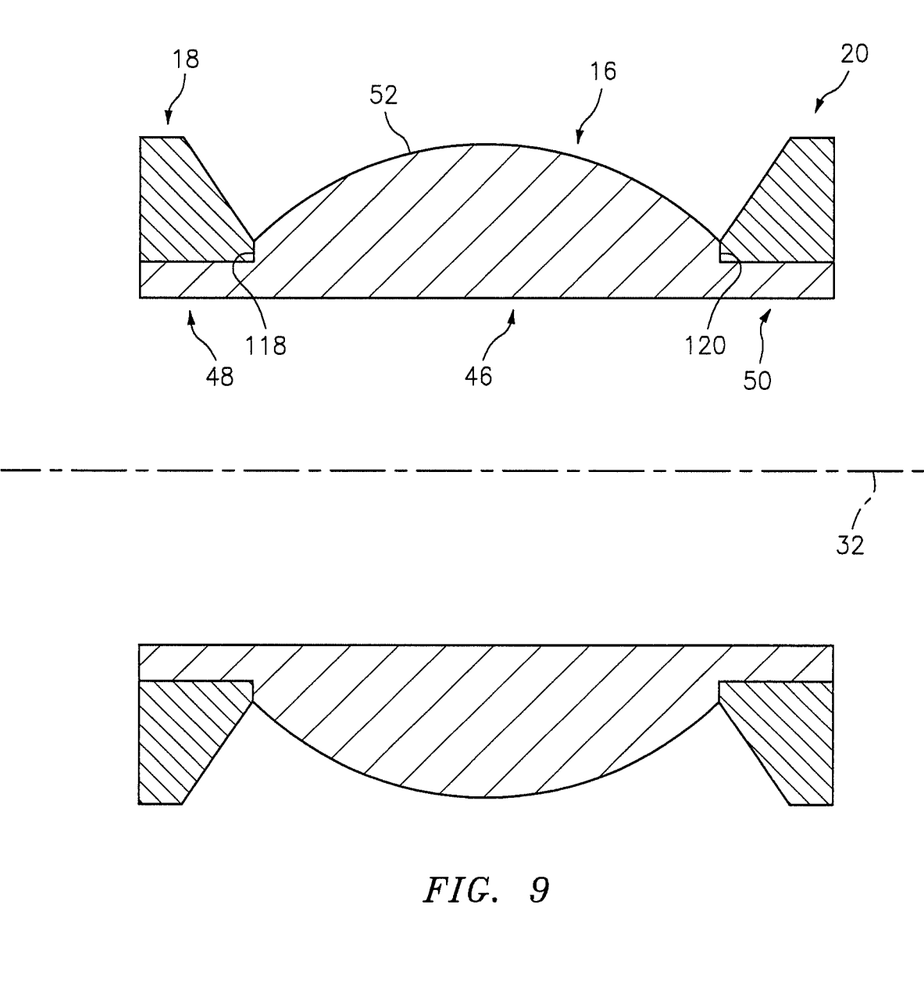

The joint assembly components of the present disclosure may have various configurations different than those specifically described above. For example, in some embodiments, at least a portion of the collar surface 78, 92 may be configured with a generally spherical geometry. In some embodiments, at least a portion of the collar surface 78, 92 may have a complex (e.g., splined and/or compound) geometry. In some embodiments, referring to FIG. 7, one or more of the collars 18 and 20 may be separated from the spherical bearing 46 by gaps; e.g., a spacer segments 110 and 112. In some embodiments, referring to FIG. 8, one or more of the collars 18 and 20 may be configured such that its minimum radius value of the radius 80, 94 at the intersection between the collar 18, 20 and the spherical bearing 46 is greater than the minimum radius value of the radius 58 at that intersection. Each collar 18, 20, for example, includes an annular shoulder 114, 116 at its collar end. In some embodiments, referring to FIG. 9, one or more of the collar mounts 44 and 46 may be radially recess from the spherical surface 52 such that the collars 18 and 20 may be positioned axially against annular shoulders 118 and 120 (e.g., of the spherical bearing 46). The present disclosure, of course, is not limited to the foregoing exemplary joint assembly component configurations.

In some embodiments, the first collar 18 and/or the second collar 20 may be formed from the same material as the bearing sleeve 16. In other embodiments, the first collar 18 and/or the second collar 20 may be formed from a different material than the bearing sleeve 16. The first collar 18 and the second collar 20, for example, may be formed from a material with a higher tensile strength than the material of the bearing sleeve 16, which may have a high compressions strength but relatively low tensile strength. These different materials, however, may have similar thermal growth characteristics. Examples of materials from which one or more of the joint assembly components may be formed include, but are not limited to, stainless steel, Ni-alloy, Co-alloy, and Ti-alloy.

The first mount 28 is described above as being swaged on the spherical bearing 46. However, in other embodiments, other methodologies may also or alternatively be used to capture the spherical bearing 46 within the bearing aperture 102. For example, one or more bearing caps may be attached to sides of the first mount 28 after the spherical bearing 46 is positioned within the bearing aperture 102.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A bearing joint assembly, comprising:
    a bearing sleeve extending axially along a centerline between opposing first and second axial ends, the bearing sleeve including a spherical bearing, and the bearing sleeve formed as a monolithic body;
    a first collar configured with the bearing sleeve, the first collar extending axially between opposing first collar ends, wherein one of the first collar ends of the first collar is axially aligned with and forms an end surface with the first axial end of the bearing sleeve, wherein a first annular channel is formed by and extends axially between the spherical bearing and the first collar, and wherein the first collar circumscribes the bearing sleeve;
    a first mount mounted on and slidably engaging the spherical bearing;
    a pair of second mounts, the spherical bearing and the first collar axially between the second mounts; and
    a fastener projecting through the bearing sleeve and securing the bearing sleeve to the second mounts;
    wherein the first annular channel provides space for the first mount to pivot about the spherical bearing and freely articulate between the second mounts.

2. The bearing joint assembly of claim 1, wherein the first collar is mechanically attached to the bearing sleeve.

3. The bearing joint assembly of claim 1, wherein the first collar is bonded to the bearing sleeve.

4. The bearing joint assembly of claim 1, wherein the bearing sleeve comprises a first material, and the first collar comprises a second material different from the first material.

5. The bearing joint assembly of claim 1, wherein
    the spherical bearing includes a radial outer spherical surface with a minimum radius value; and
    the first collar includes a radial outer collar surface with a maximum radius value that is greater than the minimum radius value of the radial outer spherical surface.

6. The bearing joint assembly of claim 5, wherein
    the radial outer spherical surface has a maximum radius value; and
    the maximum radius value of the radial outer collar surface is less than or equal to the maximum radius value of the radial outer spherical surface.

7. The bearing joint assembly of claim 5, wherein
the radial outer spherical surface has a maximum radius value; and
the maximum radius value of the radial outer collar surface is greater than the maximum radius value of the radial outer spherical surface.

8. The bearing joint assembly of claim 1, wherein the first collar includes a radial outer collar surface, and at least a portion of the radial outer collar surface tapers radially inwards as the first collar extends axially towards the spherical bearing.

9. The bearing joint assembly of claim 8, wherein the at least a portion of the radial outer collar surface is a first portion, and a second portion of the radial outer collar surface has a cylindrical geometry.

10. The bearing joint assembly of claim 1, further comprising:
a second collar configured with the bearing sleeve;
wherein a second annular channel is formed by and extends axially between the spherical bearing and the second collar; and
wherein the spherical bearing is axially between the first collar and the second collar.

11. The bearing joint assembly of claim 1, further comprising:
a strut comprising the first mount; and
a turbine engine component comprising the second mounts.

12. A bearing joint assembly, comprising:
a bearing sleeve extending axially along a centerline between opposing first and second axial ends of the bearing sleeve, and the bearing sleeve including a spherical bearing, wherein the spherical bearing includes a radial outer spherical surface with a minimum radius value, and wherein the bearing sleeve is configured as a monolithic body;
a first collar circumscribing and configured with the bearing sleeve, wherein the first collar includes a radial outer collar surface with a maximum radius value that is greater than the minimum radius value of the radial outer spherical surface, and wherein the first collar comprises metal;
a first mount mounted on and slidably engaging the spherical bearing;
a pair of second mounts, the first and the second axial ends of the bearing sleeve and the first collar axially between the second mounts, wherein the first axial end of the bearing sleeve axially contacts one of the second mounts; and
a fastener projecting through the bearing sleeve and securing the bearing sleeve to the second mounts;
wherein the radial outer spherical surface has a maximum radius value; and
wherein the maximum radius value of the radial outer collar surface is less than or equal to the maximum radius value of the radial outer spherical surface.

13. The bearing joint assembly of claim 12, wherein the first collar is mechanically attached to and/or bonded to the bearing sleeve.

14. The bearing joint assembly of claim 12, wherein an annular channel is formed by and extends axially between the spherical bearing and the first collar.

15. A bearing joint assembly, comprising:
a bearing sleeve extending axially along a centerline between opposing first and second axial ends of the bearing sleeve, and the bearing sleeve including a spherical bearing, wherein the bearing sleeve is a monolithic body;
a first collar mechanically attached to and/or bonded to the bearing sleeve, wherein a first annular channel is formed by and extends axially between the spherical bearing and the first collar, wherein a first collar axial end of the first collar is axially aligned with and forms an axial first end surface with the first axial end of the bearing sleeve, wherein the first collar axially overlaps a portion of the bearing sleeve, and wherein the first collar is metal;
a second collar configured with the bearing sleeve, wherein a second annular channel is formed by and extends axially between the spherical bearing and the second collar, and wherein a second collar axial end of the second collar is axially aligned with and forms an axial second end surface with the second axial end of the bearing sleeve; and
a linkage including a first mount slidably engaged with the spherical bearing, wherein the spherical bearing is captured within an aperture extending axially through the first mount.

16. The bearing joint assembly of claim 15, wherein the second collar is mechanically attached to and/or bonded to the bearing sleeve.

17. The bearing joint assembly of claim 15, wherein the bearing sleeve comprises a first material, and the first collar comprises a second material different from the first material.

18. The bearing joint assembly of claim 15, wherein
the spherical bearing includes a radial outer spherical surface with a minimum radius value; and
the first collar includes a radial outer collar surface with a maximum radius value that is greater than the minimum radius value of the radial outer spherical surface.

* * * * *